United States Patent [19]

Ott et al.

[11] 4,065,922

[45] Jan. 3, 1978

[54] LOAD LIFTING AND LOWERING CONTROL SYSTEM

[75] Inventors: James I. Ott, Portland; Delmar G. Schwab, Milwaukie, both of Oreg.

[73] Assignee: Hyster Company, Portland, Oreg.

[21] Appl. No.: 716,476

[22] Filed: Aug. 23, 1976

[51] Int. Cl.[2] .............................................. F16H 39/46

[52] U.S. Cl. ........................................ 60/445; 60/461; 60/468; 91/444

[58] Field of Search ................. 60/427, 445, 450, 461, 60/462, 466, 468, 494; 91/418, 444, 446, 461

[56] References Cited

U.S. PATENT DOCUMENTS

| | | | |
|---|---|---|---|
| 1,972,462 | 9/1934 | Schafer | 60/460 |
| 2,608,824 | 9/1952 | Kirkham | 60/461 |
| 3,878,679 | 4/1975 | Sievenpiper | 60/445 X |

*Primary Examiner*—Edgar W. Geoghegan
*Attorney, Agent, or Firm*—Francis L. Swanson

[57] ABSTRACT

A hydraulic control arrangement for the lifting and lowering of loads is disclosed. The system is illustrated in an industrial truck and includes a multiple element control valve with timing circuitry to eliminate unwanted transient pressure surges during valve actuation. Series-parallel oil flow paths are provided for directing and controlling oil from the load lifting cylinder to the oil reservoir when the load is being lowered.

21 Claims, 10 Drawing Figures

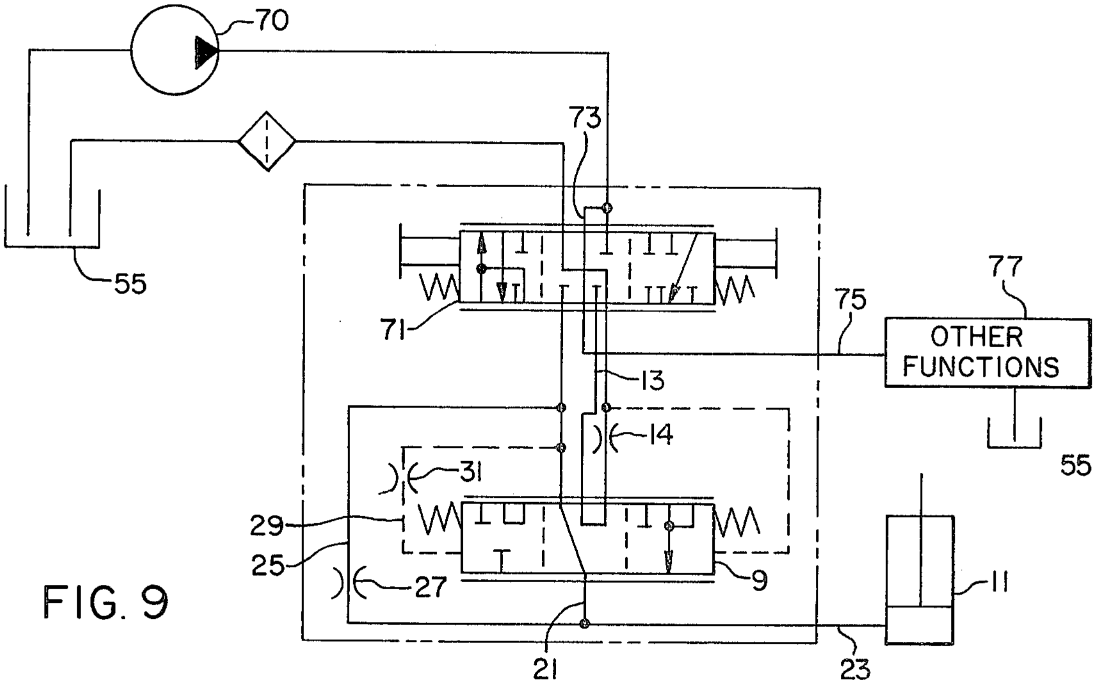
FIG. 9
FIG. 10
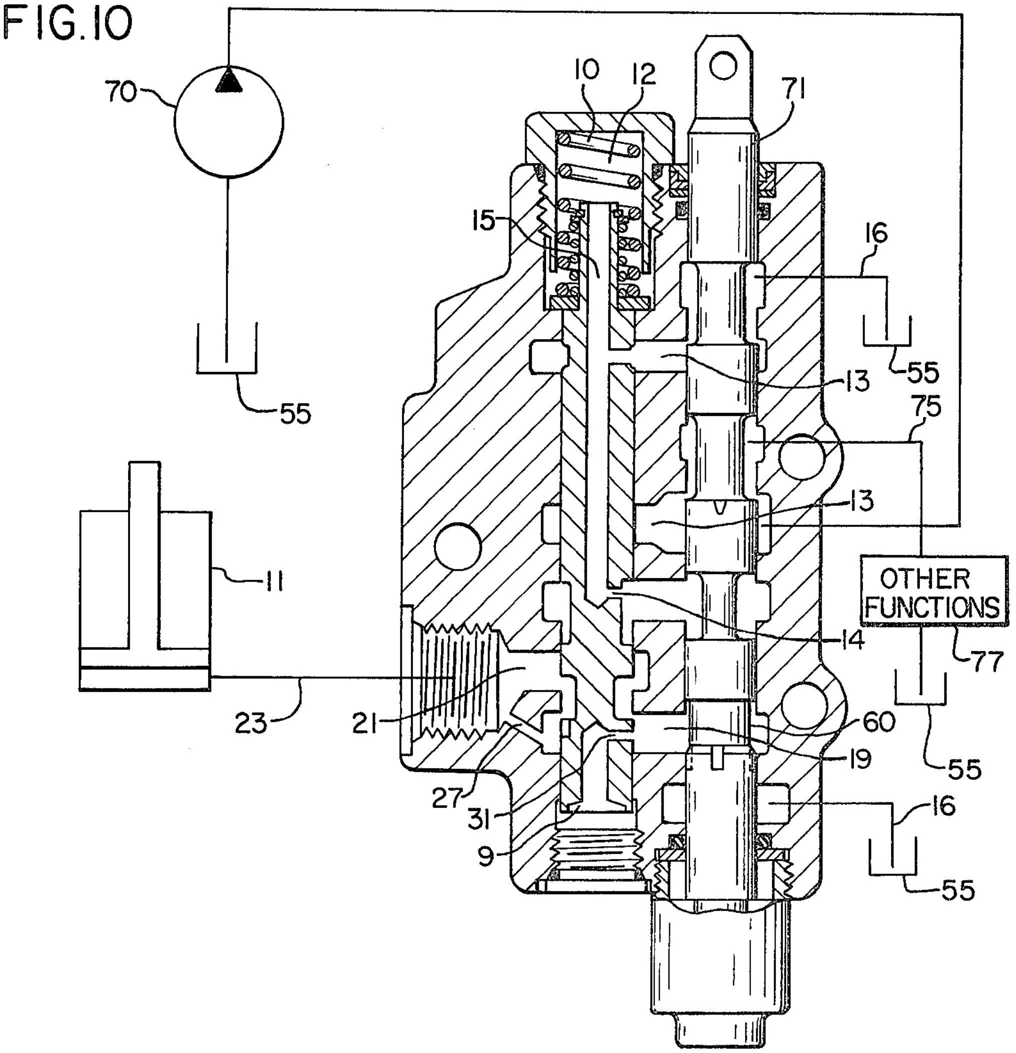

LOAD LIFTING AND LOWERING CONTROL SYSTEM

BACKGROUND OF THE INVENTION

1. Field of the Invention

This invention relates to an improved arrangement for controlling the lifting and lowering of loads using hydraulics generally.

2. Description of the Prior Art

Previous systems employ multiple position spool valves to direct oil to and from the load lifting and lowering cylinder. Many systems include a maximum lowering speed control valve, usually attached to the cylinder. However, it is sometimes included with the main manual control valve. These lowering control systems usually have one or more of the following problems: instability; initial surge or lurch; poor lowering speed control vs. load; poor operator metering control; noisy operation; and high separate component cost.

Some systems incorporate pressure compensator spools within the main control valve. If these spools also act as a load check valve, initiation of a sudden damand for lift can cause a delay and then a pressure surge to appear in the lift cylinder. This is due to the high inertia of the relatively heavy compensator spool when it must suddenly move from a closed to an open position.

Some well known closed center load-sensing systems include a bleed-down type pilot circuit. These systems can have problems with the load drifting down slowly during demand for slow lift. In order to eliminate or minimize this problem, very critical land sequence tolerancing of two spool lands operating simultaneously is required.

SUMMARY OF THE INVENTION

The present invention is directed to and has as its principal object improved hydraulic lifting and lowering control systems; here illustrated for use in industrial trucks.

A further object of the invention is to provide a system having a built-in lowering control integral with the main valve with good lowering speed vs. load characteristics.

A further object of the invention is to provide a system having series-parallel paths for throttling oil from the load cylinder during lowering to reduce noise of operation.

A further object of the invention is to provide a normally closed compensator spool to prevent undesirable surging during initiation of load lowering, and to provide by-pass means around the compensator spool to facilitate fine metering of low flow with the manual control spool.

A further object of the invention is to provide a system with by-pass means which prevents complete shutoff of oil flow due to transient pressure surges, thereby maintaining stable lowering control.

A further object of the invention is to provide a system so designed that the compensator spool and associated timing circuitry acts to suppress the rate of pump pressure rise during initiation of load raising, thus preventing a pressure surge in the lift cylinder.

A further object of the invention is to provide a system wherein the compensator spool also acts as a load check valve.

A further object of the invention is to prevent load driftdown during demand for slow lift without requiring critical land sequence tolerancing between two spool lands operating simultaneously.

A further object of the invention is to provide a system which is applicable to closed center load-sensing pilot circuits of either the check valve and bleed down type or of the shuttle valve type. With minor modifications, the system can be applied to open center type circuits.

Other objects and advantages of the invention will become apparent to those skilled in the art with reference to the accompanying drawings and detailed description.

BRIEF DESCRIPTION OF THE DRAWINGS

FIG. 9 is a schematic presentation of an open center circuit version of the lift and lowering control system showing both spools in neutral.

FIg. 10 illustrates the internal construction of the open center version of the control valve.

DETAILED DESCRIPTION

Figure 1:
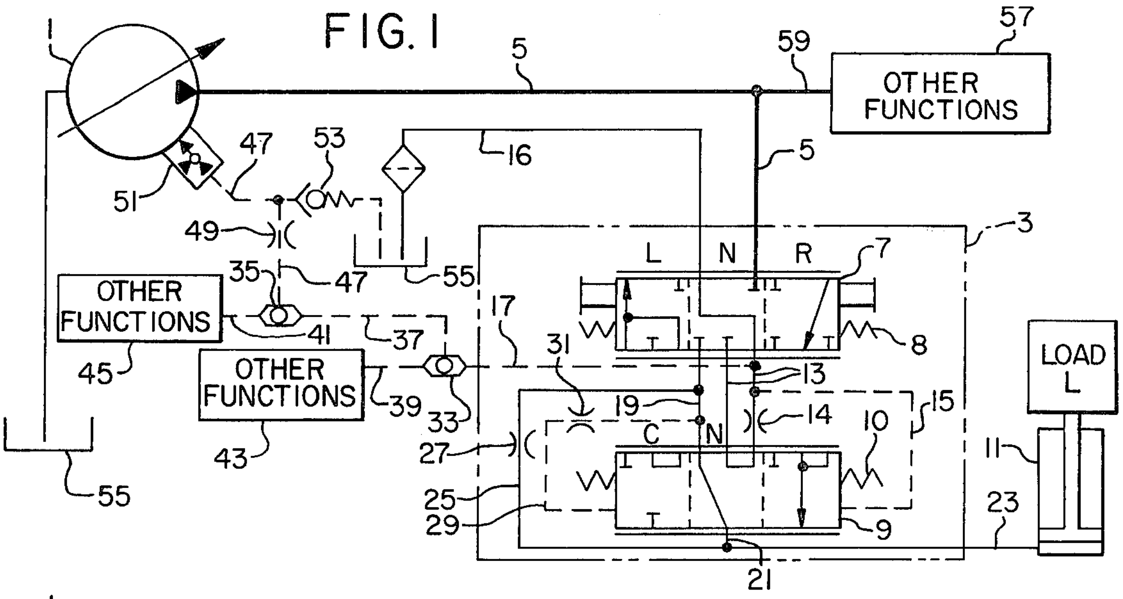
FIG. 1 is a schematic presentation showing the control system in the neutral position before initiation of the lift sequence with lift cylinder fully lowered.

One version of the control system is illustrated in FIGS. 1 through 6 and and consists of a variable displacement pump 1 which delivers oil to value 3 via line 5. Valve 3 has a manual control spool 7 for selectively raising or lowering the hoist cylinder 11. Manual control spool 7 is centered by springs 8. Also contained within valve 3 and associated with spool 7 is compensator spool 9. Spool 9 is centered by springs 10. Within valve 3 are various passages which route oil to spools 7 and 9 and to other components to be described below.

Figure 7:
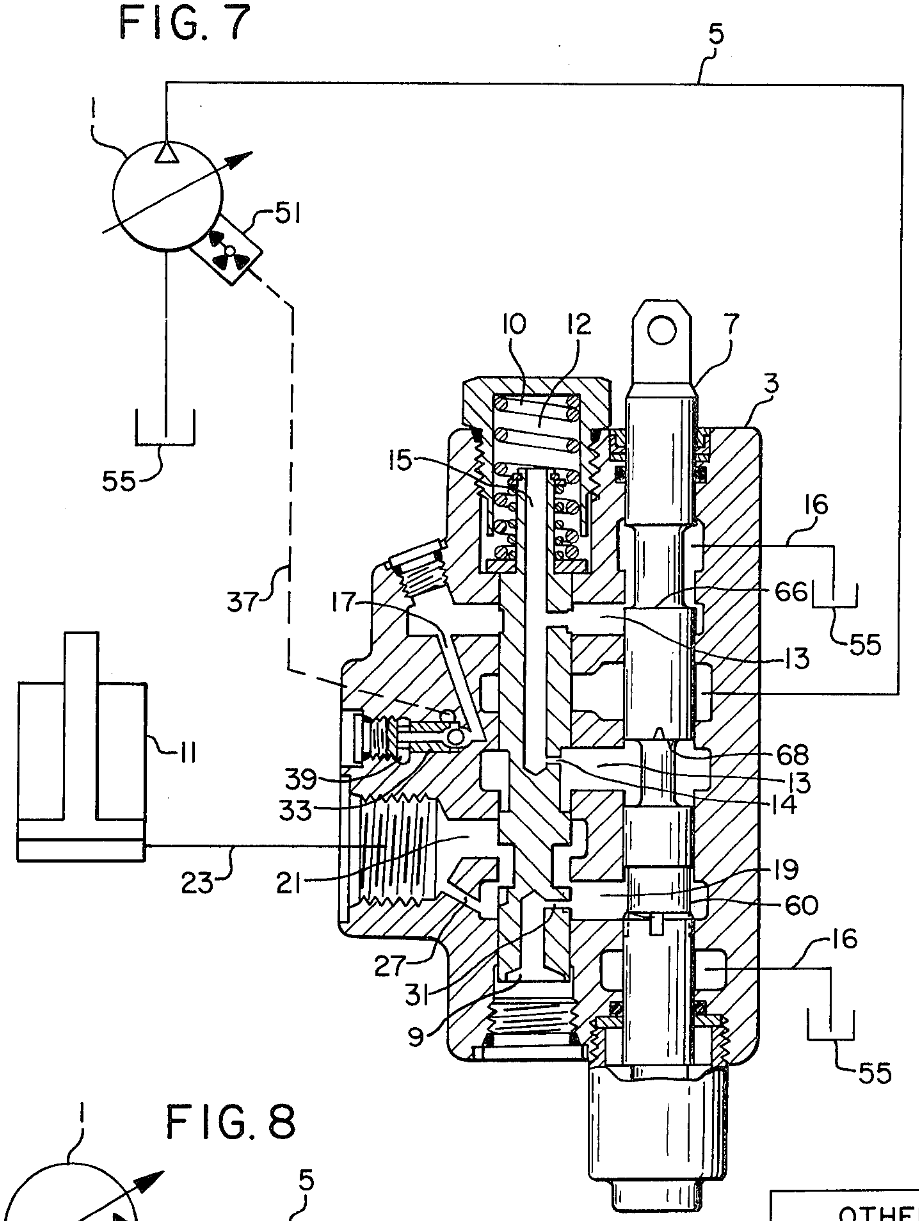
FIG. 7 illustrates the internal construction of the control valve.

Passageway 13 connects control spool 7 to compensator spool 9. A pilot line 15 branches from passage 13 to one end of compensator spool 9 through end chamber 12. Chamber 12 is best illustrated in FIGS. 7 and 10. A second pilot line 17 branches from passage 13. The function of this line will be described below.

A second passageway 19 leads from control spool 7 to compensator spool 9. A passageway 21 leads from the compensator spool 9 to the hoist cylinder supply line 23. Line 23 is operatively connected to passage 19 by a passage 25 which contains a by-pass orifice 27. A pilot line 29 leads from passage 19 to one end of compensator spool 9 through damping orifice 31. Line 16 is a return line to reservoir 55.

Pilot line 17 leads from passageway 13 to shuttle valve 33 which is connected to shuttle valve 35 by line 37. Valves 33 and 35 are operatively connected by lines 39 and 41 respectively to other hydraulic functions 43 and 45. Line 47 leads from shuttle valve 35 through orifice 49 to the pump stroke control 51. Poppet valve 53 in line 47 provides pressure relief means and drains to reservoir 55. Other hydraulic functions 57 are supplied with oil through line 59 which branches from line 5. The system is designed to permit control of pump output volume, or pressure, or a combination thereof.

OPERATION

Lift Mode

Assume now that the operator desires to raise the load and that the spool 7 is in the neutral position N under the influence of springs 8 as illustrated by FIG. 1. Compensator spool 9 is in the neutral position N and centered by the springs 10. The operator manually shifts control spool 7 to the raise position R. The spool 7 will now direct oil from line 5 into passage 13. From passage 13, pressure oil will flow through orifice 14 into pilot line 15 and act against one end of compensator spool 9 through chamber 12 causing the spool 9 to shift. Chamber 12 is illustrated clearly in FIGS. 7 and 10. Pressure oil will also flow in line 17 and act on shuttle valves 33 and 35. These valves will shift and pressure oil will then be directed to pump control 51 via line 47. At this point, end chamber 12 associated with compensator valve spool 9 is in direct communication with the pump control 51 through line 15, line 17, line 37 and line 47.

Since the pump 1 can react to a demand for pressure oil more rapidly than the relatively massive compensator spool 9 can shift, a transient pressure surge may build up in the supply line 5 from pump 1. This pressure surge if not eliminated, will be transferred through the control valve to the hoist cylinder 11 when the compensator spool 9 finally shifts. This can cause unwanted jerking and vibration in the load carrying member associated with the hoist cylinder 11.

Figure 2:
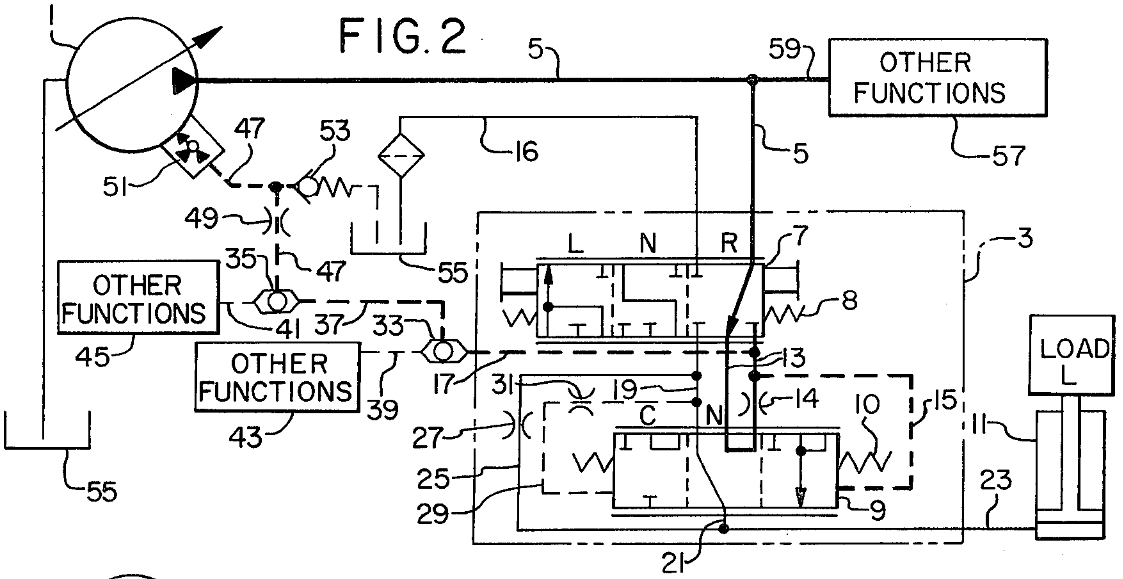
FIG. 2 illustrates the system with the manual control spool shifted to the lift position, but before shift of the compensator spool.
Figure 3:
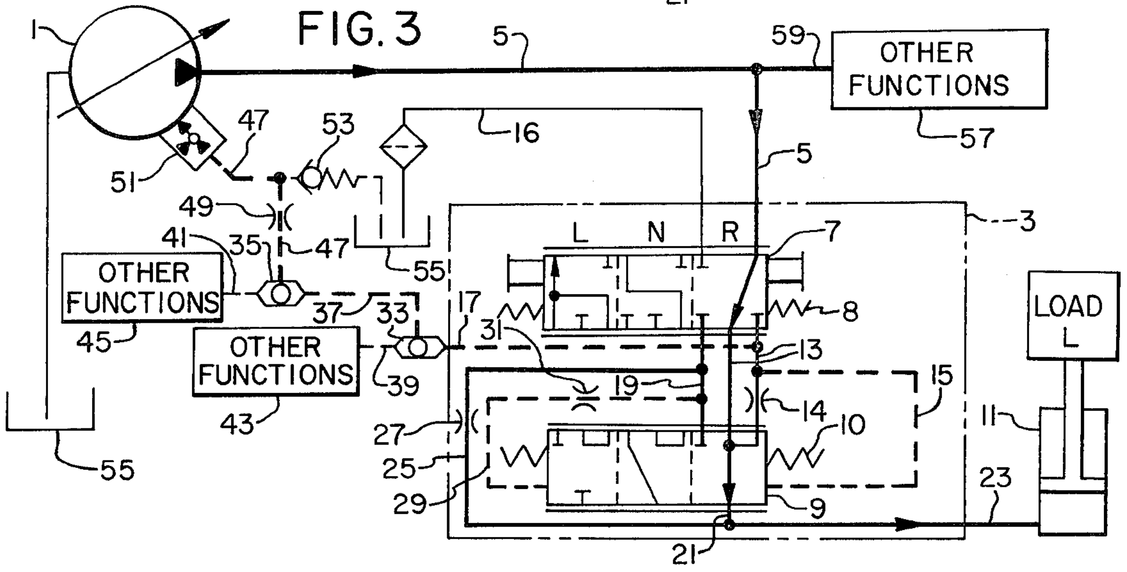
FIG. 3 illustrates the system with both the manual spool and the compensator spool in the full flow lift position.

Elimination of this unwanted pressure surge is accomplished by a timing circuit that utilizes the compensator spool 9 in conjunction with chamber 12 and lines 15 and 17 acting as an accumulator being supplied with oil through orifice 14; the chamber 12 being clearly illustrated in FIG. 7. During rapid demand for pressure oil in the lift mode, pump pressure in line 5 will appear in line 13 and through orifice 14 into passage 15. Pressure in passage 15 will cause compensator spool 9 to begin to move, but due to its relatively large mass, inertia, and relatively long dead band, compensator spool 9 will remain closed momentarily, as illustrated in FIG. 2. Since the pressure cannot pass into line 23 and reach cylinder 11, it will be directed through pilot passage 17 to shuttle valves 33 and 35 and on to pump stroke control 51. Ordinarily, this would cause momentary deadheading of pump 1 at maximum pressure until compensator spool 9 finally opened to line 23. However, orifice 14 prevents direct communication of pump pressure to pilot passage 17, allowing the moving spool 9 and its end chamber 12 to act as an accumulator in conjunction with passages 15 and 17. This delays the pressure build-up in passage 17, which in turn delays pump pressure build-up in line 5. As pressure in passage 15 builds in a controlled manner through orifice 14, spool 9 finally shifts. This opens passage 21 and admits pressure oil smoothly to line 23 causing cylinder 11 to raise the load L as illutrated in FIG. 3. Since the end of spool 9 opposite end chamber 12 is always sensing cylinder load pressure through orifices 27 and 31, the timing circuit response is dependent upon pressure; lighter loads causing a slower rate of pressure build-up than heavy loads in the load-sensing pilot line 17 to the pump stroke control 51. Thus the pump pressure in line 5 and passage 13 is matched to the cylinder load pressure in line 21 at the time compensator spool 9 opens, resulting in the previously mentioned smooth admission of oil to the load cylinder 11.

When spool 7 is shifted back to the neutral position N by the operator, spool 9 shifts back to the load check position C under the influence of pressure from cylinder 11 in line 29 and spring 10.

Figure 8:
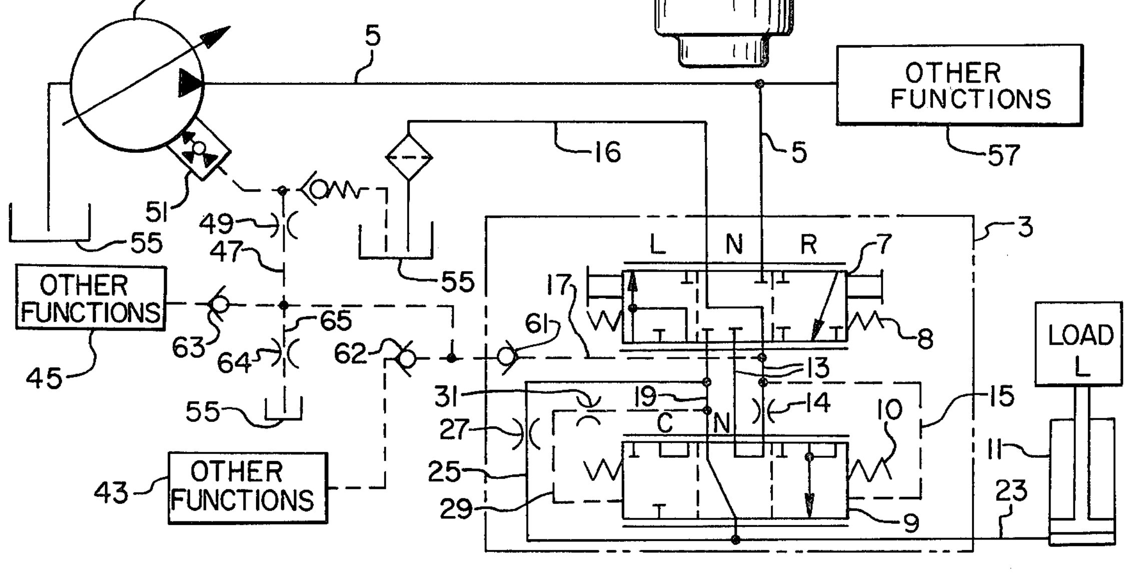
FIG. 8 illustrates the system in the neutral position with fully lowered lift cylinder similar to FIG. 1, but including a check valve and bleed down type pilot circuit.

FIG. 8 shows the same system as FIG. 1 except that load-sensing pilot circuit uses check valves 61, 62 and 63 and a bleed down path 65 through orifice 64 instead of the shuttle valve circuit shown in FIGS. 1 through 7. Both types of closed center load-sensing pilot circuits are commonly used and this invention is applicable to either type.

During demand for very slow lift, previous bleed-down systems could allow the load cylinder 11 to slowly drift down. This is caused by the bleed flow through orifice 64 not being fully supplied by pump 1 across spool 7. The difference in required bleed oil will come from cylinder 11, causing it to drift down. This problem can be minimized by controlling the sequencing of the two lands 66 and 68 of spool 7 through very critical tolerancing; the lands 66 and 68 controlling the admittance of oil from the pump 1 and the simultaneous opening of compensator spool 9. The present ivention prevents the drift problem from occurring by using the accumulator timing circuitry of orifice 14, passage 15, and end chamber 12 previously described. This circuitry will delay the pressure build-up in end chamber 12, which delays the opening of spool 9 until oil requirement to the bleed orifice 64 has been fully satisfied. This is all accomplished without any critical land sequence tolerancing between the two lands 66 and 68 on spool 7.

FIG. 9 shows the same system as FIG. 1 except it is for open center applications using a fixed displacement pump 70. Only a few areas in the present invention need be altered in order to accommodate this type of system. Manual spool 71 includes an open center carryover path 73 which routes oil through spool 71 and on to passage 75 to other downstream functions 77 or to reservoir 55 in the neutral position N. The load-sensing pilot circuitry which communicates with the pump stroke control of FIG. 1 is completely eliminated. Compensator spool 9 remains unchanged. FIG. 10 shows the internal constructon of the valve.

In the lift mode the system functions as previously described with the following exceptions: When manual spool 71 is shifted to the raise position R, open center carryover path 73 is blocked off and pump flow is diverted to passage 13. The timing circuit as previously described is, of course, inoperable because the fixed displacement pump does not have a stroke control which can be manipulated. Therefore, some other means must be used to prevent an unwanted pressure surge in the pump supply line due to slow shifting of compensator spool 9. This may be accomplished by enlarging orifices 14 and 31 for less damping.

OPERATION

Lowering Mode

Figure 4:
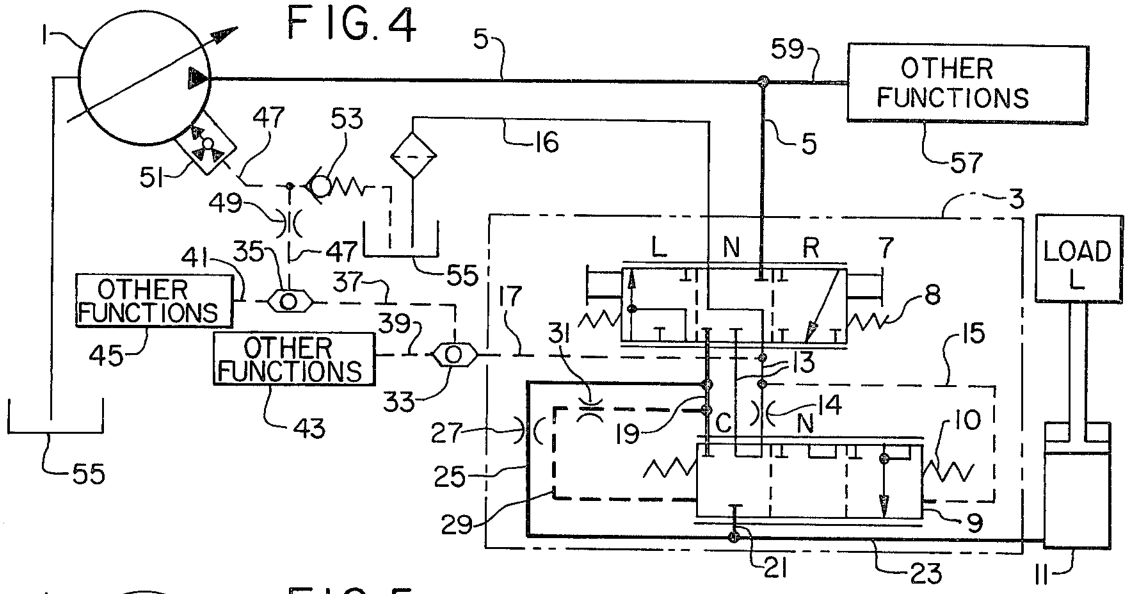
FIG. 4 illustrates the system with a load raised and the compensator spool in the closed position prior to initiation of the lowering sequence.
Figure 5:
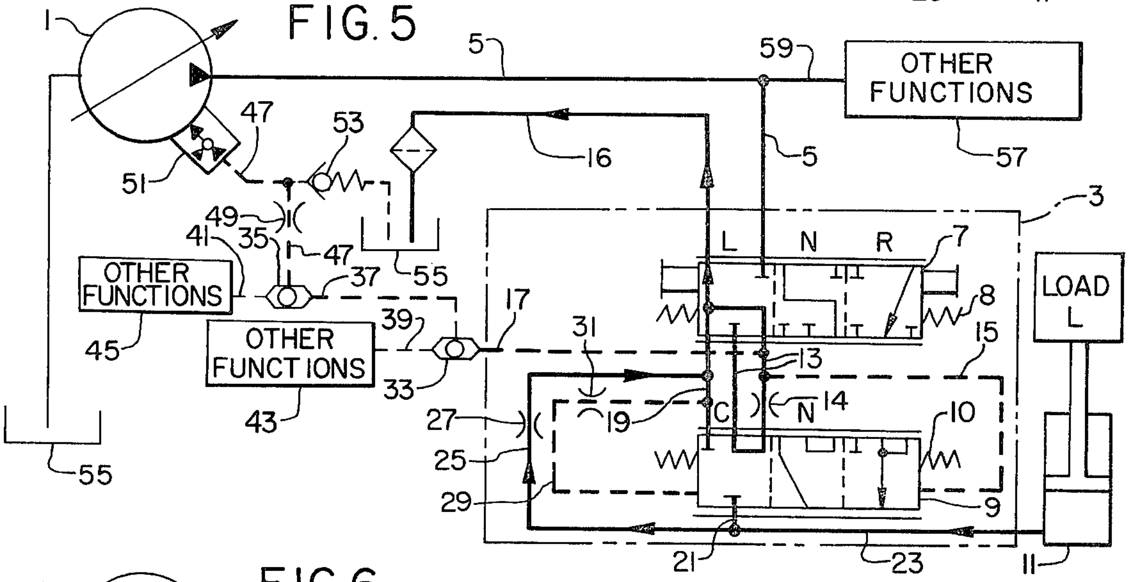
FIG. 5 illustrates the control with the manual spool in the lowering position and the compensator spool being by-passed.
Figure 6:
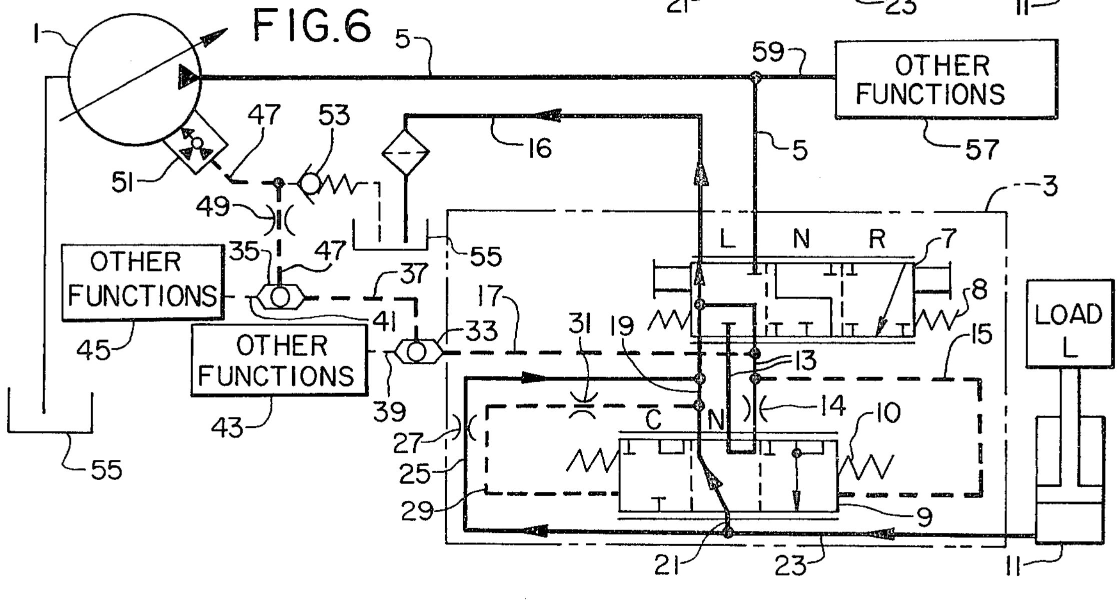
FIG. 6 illustrates the control with both spools shifted to the full flow position.

In the lowering mode, as illustrated by FIGS. 4, 5, and 6 compensator spool 9, in combination with manual spool 7, will act as a pressure compensated flow control that is continuously variable by the operator through manual control of spool 7 up to a pre-established maximum rate built into the valve. The maximum rate is controlled by the force of spring 10 of FIG. 7. Spring 10 is removable and may be replaced with a spring having a different spring force thus altering the maximum lowering rate. The result is a lowering control which is consistant through the full load range of cylinder 11, providing nearly constant maximum lowering speed within such range. FIG. 4 shows the relation of the valve spool 7 and 9 with a load in the raised position ready for lowering.

Manual control spool 7 is in the neutral position N. Because cylinder 11 is in the raised position and supporting a load, compensator spool 9 is shifted in the right, acting as a load check valve by blocking return oil flow from cylinder 11. This is the load check position C.

Assume now that the operator shifts control spool 7 to the lower position L as illustrated in FIG. 5. As lowering starts, flow from cylinder 11 will pass from line 23 through by-pass passage 25 and orifice 27 into passageway 19. The compensator spool 9 will, at this point, still be closed in the load check position C. Spool 7 will direct the oil into line 16 and on to sump 55. Load pressure from cylinder 11 is now being throttled in two places: the first across orifice 27 and the second across spool 7. Spool 7 is a continuously variable metering orifice that establishes a pressure differential that acts aross compensator spool 9 through passages 15 and 29.

As manual spool 7 is further opened, its effective orifice area becomes larger, decreasing the pressure differential across the spool 7 and increasing the pressure drop across the by-pass orifice 27. The pressure in passage 19 between spool 7 and orifice 27 will therefore reduce. This will be sensed by damping orifice 31 through passage 29 at the end of spool 9. When this pressure drops to a predetermined level, spring 10 will shift compensator spool 9 so it begins to admit oil from passage 21 into passage 19. This flow across spool 9 will increase until the pressure drop across manual spool 7 raises the pressure in passage 19 and 29 sufficient to oppose spring 10. At this point, compensator spool 9 will open no further and lowering flow from line 23 will be limited to that which is now passing through by-pass orifice 27 and across spool 9 as shown in FIG. 6. Note that spring 10 is removable and may be replaced by a spring having a different spring force thus altering the maximum lowering rate.

This design provides parallel paths for oil from cylinder 11 to flow to line 17. Note that line 25 and orifice 27 comprise a by-pass circuit around compensator spool 9. Thus, even though the spool 9 may remain closed, as when the control spool 7 is open only very slightly to achieve extremely slow lowering, a path is available to drain oil to the sump 55. This provision in the design for series-parallel paths for flow of oil in the lowering mode prevents system instability by reducing Bernoulli forces on the compensator spool and preventing complete cutoff of the oil flow in the event a transient pressure surge completely closes compensator valve 9. Smooth, stable lowering is also enhanced by the compensator spool 9 being normally closed rather than open in the neutral position N. This prevents an initial surge when starting to lower a load.

Providing series-parallel paths for flow of oil in the lowering mode reduces noise of operation. The series paths, or pressure drops, reduce noise by reducing the magnitude of each drop, eliminating cavitation noise at each throttling point. The parallel paths break up the flow disruptions and vortices into several small energy loss units instead of a single large one, further reducing noise.

Maximum lowering speed setting is established by spring 10 and the diameter of spool neck 60 of spool 7 as shown in FIG. 7. By controlling the diameter of spool neck 60, the maximum orificing area across spool 7 is established at full spool stroke without the need to hold tight tolerances on spool stroke length. As previously noted, the design also provides for a simple means to change maximum lowering flow setting for different size vehicles merely by replacing spring 10 with a spring of different force.

In the variation of this invention shown in FIGS. 9 and 10 where it is used with a fixed displacement pump in an open center system, the lowering mode operates in a nearly identical manner to the previous description with the following exceptions: When manual spool 71 is shifted to the lower position L, open center path 73 remains open to passage 75 to other downstream functions or to tank. All load-sensing pilot circuitry shown in FIG. 1 such as passages 17, 37 and 47 is completely eliminated.

While the preferred embodiment of the invention has been shown and described in detail and illustrates the application of the inventive principles, it will be understood by those skilled in the art that the invention may be embodied otherwise without departing from the true spirit and scope of the disclosed invention. The invention is not restricted to applications embodying variable or fixed displacement pumps as described here. The invention can be used with any type of hydraulic power supply whether it be pump or accumulator. The invention is applicable to any load lifting and lowering application utilizing 3-way valving. For example: a variation using a fixed displacement pump in combination with a load-sensing unloading valve could be used without departing from the inventive principles disclosed here. We claim as our invention all such modifications and variations as fall within the scope of the appended claims.

We claim:

1. A hydraulic control system for controlling the lifting and lowering of a load comprising:
   - a source of hydraulic pressure fluid;
   - a hydraulic lifting and lowering motor;
   - a main control valve having a first, selectively positionable, control spool, the valve operatively connected to the fluid source and to the motor;
   - and a variable pressure compensated lowering speed control, the control including a second control spool sensitive to system flow associated with the main control valve, the second spool operable to vary fluid flow within the system in response to selective positioning of the first spool.

2. The construction of claim 1 wherein the lowering speed control includes a first fluid path containing a plurality of pressure drop means;
   - and a second fluid path operatively parallel to the first path and containing pressure drop means, the paths and pressure drop means operable to effect reduction of noise within the system.

3. The construction of claim 1 wherein the second spool of the lowering speed control acts as a flow control during lowering and further acts as a load check valve to prevent back flow of pressure fluid from the motor when the main control valve is in a neutral position or in a lift position.

4. The construction of claim 3 wherein the lowering speed control includes a fixed by-pass passage around a metering land of the spool and an orifice so that complete shut-off of pressure fluid flowing from the load motor by the spool is prevented,.

5. The construction of claim 3 wherein the valve includes a spring associated with the spool, the spring force adapted to fix the maximum lowering speed, the spring being replaceable so that a use of a spring of different force changes the maximum lowering speed.

6. The construction of claim 3 wherein the spool is normally closed at a metering land when the spool is in the neutral position.

7. A hydraulic fluid control system for controlling the lifting and lowering of loads comprising:
- a pump;
- a reservoir of hydraulic fluid operatively connected to the pump;
- a control valve for directing pressure fluid from the pump to and from a load lifting and lowering motor;
- passage means connecting the valve to the pump and to the motor;
- a first manually controlled spool within the valve;
- a second pressure-compensated spool associated with an end chamber within the valve body, the second spool respnsive to flow rates across the first spool;
- first pilot passage means connecting the first spool to the second spool through the end chamber;
- second pilot passage means connecting the first spool to the second spool opposite the end chamber;
- third pilot passage means adapted for communication of the end chamber with the pump;
- by-pass passage means within the valve for routing fluid around the second spool during lowering of the load lifting motor;
- and return passage means for routing fluid from the valve to the fluid reservoir.

8. The construction of claim 7 wherein parallel return paths for fluid from the cylinder to the reservoir return passage are provided during relatively fast lowering rates.

9. The construction of claim 7 wherein the second spool is normally closed during slow lowering rates and fluid is only routed through the by-pass passage means.

10. The construction of claim 7 wherein the second spool is normally closed during neutral load holding.

11. A hydraulic directional control system comprising:
- a pump having means for controlling the output volume of the pump;
- a reservoir of hydraulic fluid operatively connected to the pump;
- a hydraulic valve for directing pressure fluid from the pump to the load moving motor;
- a first manually controlled spool within the valve;
- a second spool within the valve responsive to positioning of the first spool within the valve;
- means associated with the second spool for delaying response of the pump output control after positioning of the first spool;
- plural passage means within the valve including by-pass means around the second spool;
- a hydraulic line connecting the load motor with the valve;
- and a fluid return line from the valve to the reservoir.

12. The construction of claim 11 wherein the by-pass means is operable only when the manual spool is in a load return position.

13. The construction of claim 11 wherein the pump delay means includes timing circuit means including an end chamber, an orifice, and a fluid passage associated with the second spool; and
- pilot passage means interposed between and in communication with the end chamber and means for controlling output of the pump, the passage means operatively connected to the control valve.

14. The construction of claim 11 wherein the pump includes means for variably controlling the volume output of the pump.

15. The construction of claim 11 wherein the pump includes means for variably controlling the pump pressure.

16. The construction of claim 11 wherein the pump is of fixed displacement and operatively connected to control means operable to delay response of a pump output control, the control being load responsive and including an unloading valve to vary the output of the pump.

17. A hydraulic fluid directional control system for controlling the movement of loads comprising:
- a pump including means for controlling the output of the pump;
- a reservoir of hydraulic fluid operatively connected to the pump;
- a load moving motor;
- a directional control valve having a plurality of chambers, the valve connected to the pump through a supply line and to the load moving motor, the valve including a manually operated first spool, the spool including a plurality of separate spool segments connected by at least one spool neck segment of a diameter smaller than the spool segments, the first spool adapted for selectively controlling operation of the motor;
- a timing circuit associated with the directional control valve, the circuit including a second spool within the valve the spool operatively connected to the motor, the valve defining an end chamber associated with the second spool, the second spool adapted to act as a compensator spool during return movement of the motor and as a load check valve when the first manual spool is in a neutral position or in a position which directs fluid to the load moving motor;
- the timing circuit further including a load-sensing pilot line operatively connected to the pump control means and to the end chamber, and a fluid supply passage with an orifice therein from the first spool to the pilot line, the timing circuit operable to delay build-up of pressure in the pilot line.

18. The construction of claim 17 wherein the timing circuit delays pressure build-up in the load-sensing pilot line as a function of pressure in the load moving motor so that pressure in the supply line is substantially matched to load moving motor pressure when the second spool moves to an open position.

19. The construction of claim 17 wherein the pilot line includes means for bleeding fluid from the circuit to the reservoir.

20. The construction of claim 17 wherein the timing circuit acts to delay response of the second spool until demand for fluid by the bleed means is satisfied so that directional movement of the load on the load moving motor is prevented.

21. The construction of claim 17 wherein the maximum orificing area of the first spool is controlled by the size of the spool neck, independent of spool length.

* * * * *